No. 744,063. PATENTED NOV. 17, 1903.
C. T. GILMORE.
MANGLE.
APPLICATION FILED NOV. 5, 1900.
NO MODEL. 2 SHEETS—SHEET 1.
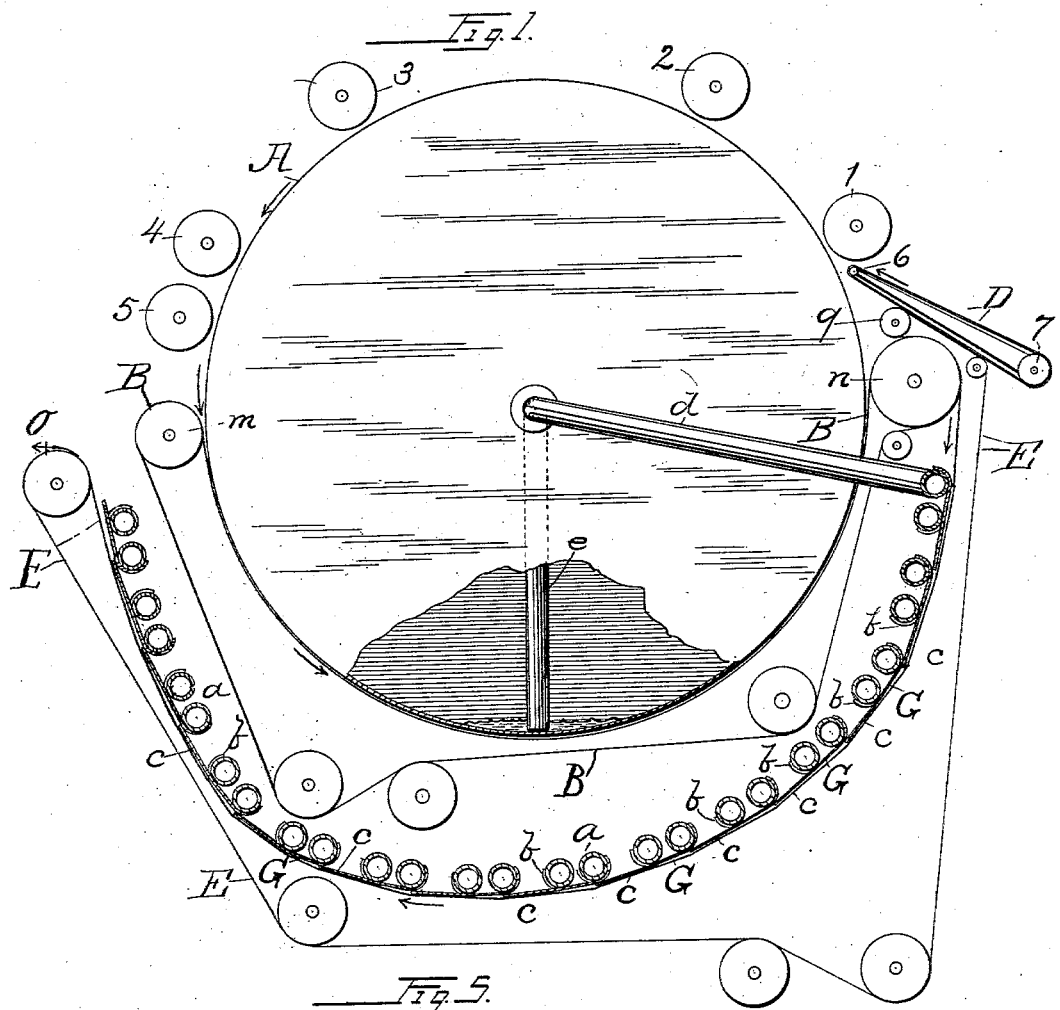
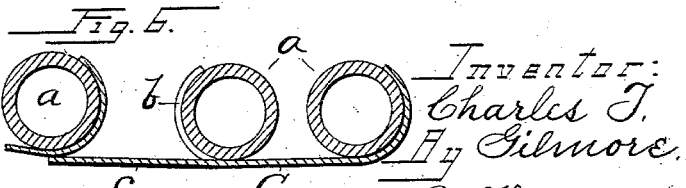
Witnesses:
H. S. Sykes
M. Friel.
Inventor:
Charles T. Gilmore.
By Frank D. Thomason Atty.

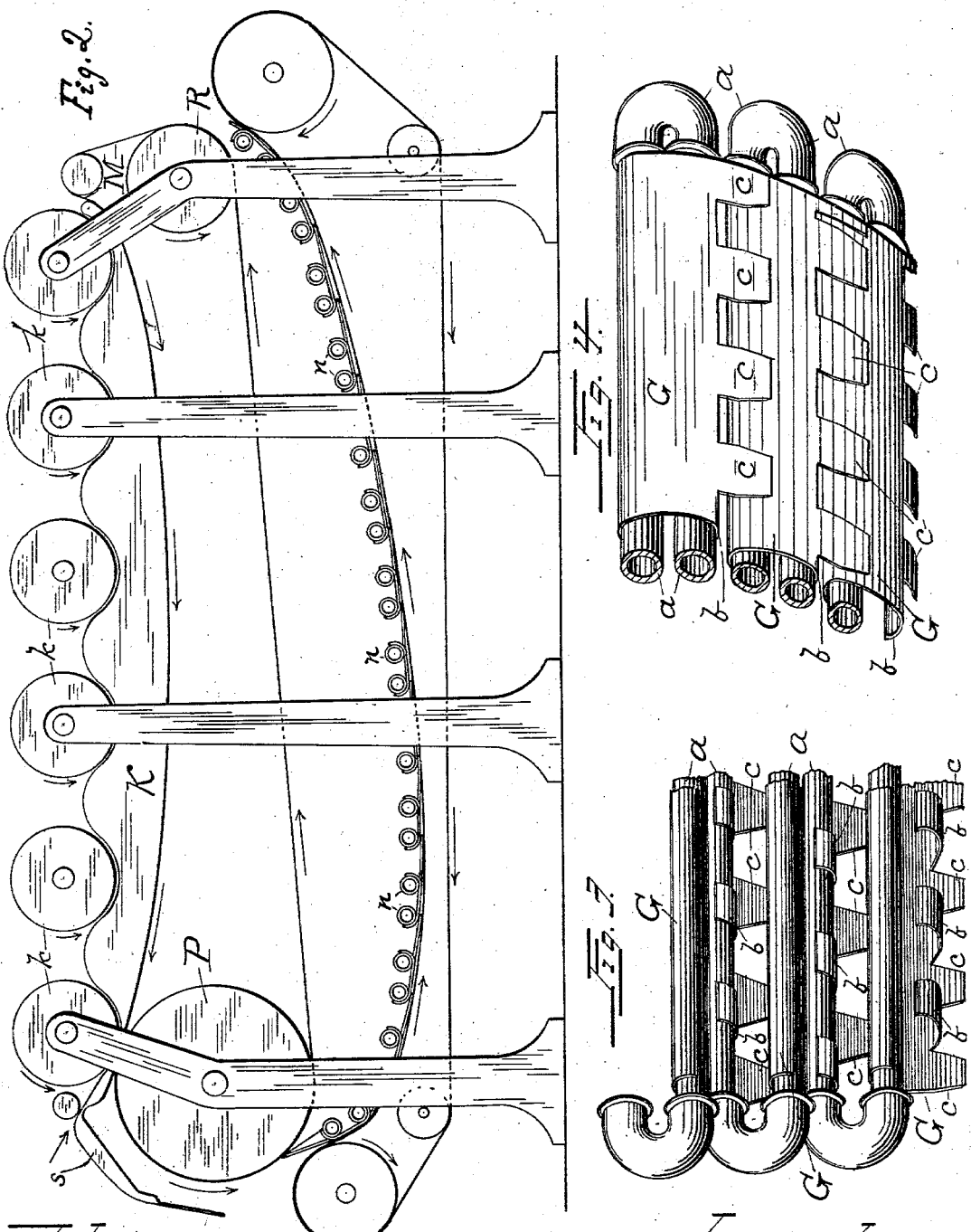

No. 744,063. Patented November 17, 1903.

UNITED STATES PATENT OFFICE.

CHARLES T. GILMORE, OF SAULT STE. MARIE, MICHIGAN.

MANGLE.

SPECIFICATION forming part of Letters Patent No. 744,063, dated November 17, 1903.

Application filed November 5, 1900. Serial No. 35,506. (No model.)

*To all whom it may concern:*

Be it known that I, CHARLES T. GILMORE, a citizen of the United States, and a resident of Sault Ste. Marie, in the county of Chippewa and State of Michigan, have invented certain new and useful Improvements in Mangles, of which the following is a full, clear, and exact specification.

My invention relates to mangles for steam-laundries. Heretofore when the goods to be ironed consisted of heavy work like sheets, pillow-cases, bedspreads, table-cloths, &c., they were quite moist when fed to the machine, and as they had but a limited opportunity to throw off the moisture in the form of vapors were generally taken out of the same in a very moist condition. The lack of ventilation prevented the moisture being thrown off from the goods in the form of vapor or steam as they passed through the machine. To accomplish this, a ventilated heating-surface is required in addition to that provided by the large cylinders or drums of the mangles now in extensive use.

The object of my invention is to provide both ample ventilation and additional heating-surface, so as to get rid of and avoid the retention of the moisture in the goods when the same are delivered from the machine. This I accomplish by the means hereinafter fully described, and as particularly pointed out in the claims.

In the drawings, Figure 1 is a diagrammatical view of a mangle illustrating the cylinder, rolls, and aprons forming a part thereof, together with my invention, which is shown in longitudinal section. Fig. 2 is a side elevation of another form of mangle to which my invention, shown in section, is applied. Fig. 3 is a perspective view of the unengaged side of my invention separated from the mangle. Fig. 4 is a similar view looking at the same from the opposite direction. Fig. 5 illustrates a coil of steam-pipes forming part of the same, and Fig. 6 shows a cross-section through several of said pipes and guards or shields attached thereto.

My invention is intended more as an attachment, such as might be made a part of many mangles now on the market, to supplement and perfect the operation of the same, or made a part and included in the design of a newly-constructed mangle, according as desired.

In Fig. 1 a mangle is shown which is constructed of a large hollow heated cylinder that is surmounted by five rollers 1, 2, 3, 4, and 5, of considerably less diameter, clothed with felt and arranged to bear on the upper surface of the heated cylinder A at short distances apart. These rollers are preferably run entirely by their contact with the periphery of the heated cylinder. The lower half of the cylinder is traversed by an endless apron of light canvas B, which passes around a drive-roller upon the feed side of the mangle and around suitable guide-rollers that direct the remainder of its course below and out of contact with said cylinder in suitable manner.

As shown by arrows in Fig. 1 of the drawings, the goods are fed between roller 1 and cylinder A by being deposited upon an endless feeding-apron D, traveling around the small rollers 6 and 7, and from thence said goods are carried forward by the revolving cylinder A under the successive rollers 2, 3, 4, and 5 until they arrive at the rear of the cylinder. Up to this point the goods will have been subjected, without pulling, to a high heat under even pressure and practically exposed to the air all the time, thus allowing evaporation of the moisture in the same to an extent which is dependent upon the degree of moisture contained in the goods at the time they were fed to the cylinder and the weight of said goods. After passing the last roller 5 the goods pass between guide-roller $m$ and said cylinder and are kept in close contact with said cylinder by the apron B, that travels around said guide-roller $m$ and the drive-roller $n$ until they reach the latter. Upon reaching drive-roller $n$ the goods, which have a tendency to adhere to the apron, are carried outward over the surface of said drive-roller and between the same and a roller 9, (preferably of considerably less diameter,) around which an outer light canvas apron E is run. This outer apron E passes over a segment of the drive-roller $n'$ to and transversely around the series of straight horizontally-arranged pipes comprised in the coils $a$, which are arranged parallel in a suitable curved line one after the other and are covered by suitable shields, which I will hereinafter more fully explain, and then passes to and around the guide-roller *o* outside of apron B, whereupon said apron E travels over a suitably-arranged series of rollers outside of said coils back to and around roller 9 again.

The coils *a*, over which my invention requires the goods after they leave the cylinder A or its equivalent to be run, preferably consist of pipe constructed as shown in Fig. 5; but this style of pipe is not absolutely essential. They simply present a convenient form of steam-chamber for furnishing a heated surface over which the goods can be run and at the same time afford large openings whereby the moisture retained in the goods after the same has left the cylinder can find an opportunity to escape in the form of vapor or steam. If desired, other forms of steam-chambers capable of performing the same function as these pipes could be used to the same practical effect, even though not quite so economically. The pipes *a* employed for the purposes of my invention I prefer to cover, or the sides thereof over which the goods are run, by shields G. These shields are shown in detail in Figs. 3 and 4, and consist, preferably, of suitable strips of sheet metal of a length corresponding to the length of the pipe of the coil *a* between the end bends thereof and of a width sufficient to permit one longitudinal edge to be rolled or curled up around one side of the pipe and the other longitudinal edge, which is slit transversely and provided with tongues *b* and *c*, to have every alternate tongue *b* bent around the farther longitudinal side of the next parallel stretch of pipe and the remaining tongues *c* to extend to and just lap against the third parallel stretch of pipe, as shown. The coil of pipe used in my invention is so constructed that the first and second, the third and fourth, the fifth and sixth stretches of pipes, and so on in similar order, are nearer together than the second and third, the fourth and fifth, and so on. This order is considered preferable because it permits of the shields embracing the paired stretches of pipes in the order given and provides an open order between each of said pairs, which is spanned or bridged by the tongues *c*, between which the vapor thrown off by the goods brought in contact with said shields can pass off and escape. The shields on the pairs of pipes are arranged thereon so that the tongues *c* of the shields of one pair will be offset or staggered with the tongues *c* of the shield covering the next pair of pipes. This is desirable, as it affords every part of the surface of the goods coming in contact with the shield an opportunity to throw off the vapor or steam generated by the contact of the same with said shields.

While the coil of pipe may be heated from a source independent of the cylinder A, I prefer to utilize the heat of the exhaust-steam, which is injected into said cylinder through one of the hollow journals thereof for this purpose. The steam is exhausted from said cylinder from the hollow journal opposite that through which it enters the cylinder A and is fed to the end stretch of pipe of coil *a* by a pipe $d$, connecting the same with said hollow journal. I order to prevent the accumulation of the liquid products of condensation in cylinder A, I extend down from the journal of the cylinder to which connecting-pipe *d* takes on the inside of said cylinder a vertical pipe *e*, which extends to near the inner circumference of the same. Any water of condensation accumulating in the cylinder will be forced out of pipe *e* through pipe *d* into the coil *a*, from whence it is discharged in a suitable manner by suitable connections.

In Fig. 2 I show my invention applied in a somewhat different manner, but on the same principle, to another form of mangle now on the market and in extensive use. This mangle comprises a steam-chest K, the upper surface of which is undulated or corrugated transversely from end to end and has a series of felt-clothed rollers *k*, journaled so that their under segments contact with and engage the valleys or concavities of said undulations. In the drawings the goods are fed between the end roller *k* and said steam-chest and is caught and moved up and down over said undulated surfaces by said series of rollers *k*, under each of which the goods pass until it reaches the other end. The course of the goods is then reversed and carried by an endless canvas apron M to and in contact with the under convex surface of said steam-chest until it reaches a point under the feeding-platform *s*. At this latter point said apron passes around a drive-roller P of a diameter preferably greater than rollers *k* and is brought in contact with the adjacent shield-covered coils *n*. These shields used in the mangle are similar in construction to those previously herein described. The apron carries the goods under the pipes of the coil *n*, by which the same is thoroughly ironed, and at the same time said coil permits ample opportunity for the evaporation of the moisture contained in the goods and delivers the same at the opposite end of the machine in any suitable manner. The arrangement of the series of pipes comprised in this coil *n* is such that between the large roller P and the opposite return-roller R of said apron they curve upward. This causes the apron to hold the goods in intimate contact with the shields of the said coil and assures a smoothness and polish to the same which the machine cannot be depended upon to give without the use of the coils and shields.

What I claim as new is—

1. The combination with a mangle of a series of parallel heating-chambers, and an apertured shield for each of the same over which the work is consecutively passed said chambers being arranged in open order and providing spaces through which the vapors thrown off from the work while in transit can escape.

2. The combination with a mangle, of a coil of steam-heated pipes, shields therefor, comprising overlapping sections over which the work is consecutively passed, said sections being fashioned and disposed at their overlapping portions to allow the vapors thrown off from the work while in transit to escape.

3. The combination with a mangle, of a coil consisting of parallel sections of pipe, shields therefor, having overlapping sections over which the work is consecutively passed, said pipe being arranged in open order and said shield-sections being so disposed as to afford spaces whereby the vapors thrown off from the work while in transit can escape.

4. The combination with a mangle, of a coil of parallel sections of pipe, and shields therefor comprising overlapping sections over which the work is consecutively passed, said pipe being arranged in open order and said shields being so constructed as to afford passage through the overlapping portions and between said pipes whereby vapors thrown off from the work while in transit can escape.

5. The combination with a mangle, of a coil comprising a series of parallel sections of pipe, and shields so constructed as to clamp and be supported by each adjoining pair of said sections of pipe, said pipe being arranged in open order and said shields provided with spaces through which the vapors thrown off from the work while in transit can escape.

6. The combination with a mangle, of a coil consisting of parallel sections of pipes arranged in pairs, and shields secured to and protecting each pair, said pipes being arranged in open order, and said shields so constructed that the vapors thrown off from the work while in transit can escape.

7. The combination with a mangle, of a coil consisting of sections of pipe, of apertured shields secured to and protecting said pipe and so constructed as to extend to and lap against the next successive section thereof, said pipe and said shields being so arranged and constructed that the vapors thrown off by the work while in contact with the same, can escape.

8. The combination with a mangle of a steam-heated coil consisting of a series of parallel sections of pipe which are arranged in pairs, and apertured shields for each pair of said pipes, which are secured thereto and extend to and lap the next consecutive pair of pipes, said pipes being so arranged that the vapors thrown off from the work while in moving contact with the shields can escape through the apertures thereof.

9. The combination with a mangle, of a coil consisting of a series of parallel sections of pipes, and shields for said pipe-sections each having one longitudinal edge thereof embracing one of said pipe-sections and the other longitudinal edge being slit transversely and every alternate tongue thus formed being bent to embrace an adjacent pipe-section and the remaining tongues extending toward the next consecutive section of pipe.

CHARLES T. GILMORE.

Witnesses:
H. S. SYKES,
FRANK D. THOMASON.